United States Patent
Saigo et al.

(10) Patent No.: US 6,606,453 B2
(45) Date of Patent: Aug. 12, 2003

(54) METHOD FOR PHOTOGRAPHING LUSTROUS OBJECTS, METHOD FOR PHOTOGRAPHING SPECTACLE FRAMES, AND METHOD FOR CREATING ELECTRONIC SPECTACLE FRAME CATALOGUE

(75) Inventors: Tsuyoshi Saigo, 13-11, Midorigaoka 2-chome, Hamura-shi, Tokyo 205-0003 (JP); Noriaki Tamura, Tokyo (JP)

(73) Assignee: Tsuyoshi Saigo, Tokyo (JP)

( * ) Notice: Subject to any disclaimer, the term of this patent is extended or adjusted under 35 U.S.C. 154(b) by 0 days.

(21) Appl. No.: 09/890,069

(22) PCT Filed: Dec. 15, 2000

(86) PCT No.: PCT/JP00/08887

§ 371 (c)(1),
(2), (4) Date: Jul. 26, 2001

(87) PCT Pub. No.: WO01/44868

PCT Pub. Date: Jun. 21, 2001

(65) Prior Publication Data

US 2002/0127008 A1 Sep. 12, 2002

(30) Foreign Application Priority Data

Dec. 17, 1999 (JP) .......................................... 11-359458

(51) Int. Cl.[7] .............................................. G03B 15/00
(52) U.S. Cl. ................................ 396/1; 396/155; 396/4
(58) Field of Search ............................. 396/1, 155, 3–5

(56) References Cited

U.S. PATENT DOCUMENTS 3,672,269 A * 6/1972 Tabankin .................... 396/427
4,771,300 A * 9/1988 Bryan
5,164,755 A * 11/1992 King ........................... 396/544
5,583,601 A * 12/1996 Peterson ...................... 396/661
5,664,232 A * 9/1997 Goto .............................. 396/1
5,970,471 A * 10/1999 Hill ............................. 705/26
6,343,184 B1 * 1/2002 Huebner ........................ 396/3

FOREIGN PATENT DOCUMENTS

JP        A 61-80222       * 4/1986

(List continued on next page.)

OTHER PUBLICATIONS

Lewton, Charles. "Further Photography Set–up Options." [Ganoksin] Jewelry Making– Further Photography Set–up Options. Retrieved Nov. 21, 2002. <http://www.ganoksin.com/borisat/nenam/photography_set_up_option.htm>.*

(List continued on next page.)

*Primary Examiner*—Russell Adams
*Assistant Examiner*—Michelle Nguyen
(74) *Attorney, Agent, or Firm*—Oliff & Berridge PLC

(57) ABSTRACT

The present invention provides a method for photographing lustrous objects, including even spectacle frames with highly reflective surfaces such as metal frames, that enables the objects to be photographed more naturally and aesthetically without any reflection on the surface of the camera or lens. The present invention also provides a method for photographing spectacle frames and a method for creating an electronic spectacle frame catalogue using this method. The method is one in which the camera 2 photographs the lustrous object 1. Optical shield members 3, 4, and 5 are placed between the camera body 21 and the lens 22 of the camera 2, and the lustrous object 1 so that a reflection of said camera 2 is not be formed on the photographed image of the lustrous object. In addition, an opening 41, having a size and shape suitable for photographing an image of the lustrous object 1, is provided in the shield member 4 of the lens 22.

6 Claims, 9 Drawing Sheets

FOREIGN PATENT DOCUMENTS

| | | | |
|---|---|---|---|
| JP | A 63-17220 | * | 1/1988 |
| JP | A2 0 260 710 | * | 3/1988 |
| JP | A 63-76581 | * | 4/1988 |
| JP | A 5-45143 | * | 2/1993 |
| JP | A 5-199518 | * | 8/1993 |
| JP | A 6-67260 | * | 3/1994 |
| JP | A 6-269002 | * | 9/1994 |
| JP | A 7-264448 | * | 10/1995 |
| JP | A 7-322100 | * | 12/1995 |
| JP | A 8-30805 | * | 2/1996 |
| JP | A 8-125898 | * | 5/1996 |
| JP | A 8-293970 | * | 11/1996 |
| JP | A 9-159899 | * | 6/1997 |
| JP | A 10-161197 | * | 6/1998 |
| JP | A 10-333231 | * | 12/1998 |
| JP | A 11-174599 | * | 7/1999 |
| JP | A 11-191856 | * | 7/1999 |
| JP | B1 3076909 | * | 6/2000 |

OTHER PUBLICATIONS

Van Riper, Frank. "Photographing Coins?– Got Milk?" Camera Works: Photo Essay (washingtonpost.com). Retrieved Nov. 21, 2002. <http://www.washingtonpost.com/wp–srv/photo/essays/vanRiper/020809.htm>.*

"Photographing Jewelry Using a Homemade Light Tent" Homemade Light Ten. Retrieved Nov.21, 2002. <http://bermangraphics.com/coolpix/jewelryphoto.htm>.*

McKern, Chuck. "Close–up Photography" Closeup Photography. Retrieved Mar. 14, 2002. <http://www.vividlight.com/articles/213.htm>.*

Bowens International, Ltd. "Guide to Lighting Techniques." Table Top Studio– Users Guide. Retrieved Nov. 21, 2002. <http://www.plumeltd.com/pdf/Cocoon%20Studio.pdf>.*

* cited by examiner

61 OPENING FOR PHOTOGRAPHY

WITH SECOND SHIELD MEMBER AND FRONT FLASH LIGHT

WITH NO SECOND SHIELD MEMBER BUT WITH FRONT FLASH LIGHT

WITH NEITHER SECOND SHIELD MEMBER NOR FRONT FLASH LIGHT

METHOD FOR PHOTOGRAPHING LUSTROUS OBJECTS, METHOD FOR PHOTOGRAPHING SPECTACLE FRAMES, AND METHOD FOR CREATING ELECTRONIC SPECTACLE FRAME CATALOGUE

TECHNICAL FIELD

The present invention relates to a method for photographing lustrous objects such as metal spectacle frames, for example, and to a method for photographing spectacle frames.

BACKGROUND ART

When creating catalogues or pamphlets for spectacle frames, or when simulating the wearing of spectacle frames, images of the spectacle frames must be photographed. For example, in the spectacle frame try-on simulation device described in Japanese Patent Application Laid-open No. 61-80222 or in Japanese Patent Application Laid-open No. 63-76581, an image of an spectacle frame is photographed with a video camera and simulation occurs by synthesizing this image with an image of a person that has been photographed separately. Furthermore, Japanese Patent Application Laid-open No. 63-172220 describes a method wherein the R, G, and B values of each dot in a static image of an spectacle frame loaded onto a computer by a video camera are scanned and the spectacle frame data and background data are separated. Here, the method for photographing the spectacle frame using a video camera involves positioning the spectacle frames in a dark box and photographing them there under indirect light.

However, it is still difficult to obtain a good image even when an spectacle frame is placed in a dark box and photographed under indirect light. In particular, when there is much surface lustre on the spectacle frame, such as with a metal frame, the camera or background images are reflected on the surface of the spectacle frame and the natural hues cannot be photographed. While the reflection on images of frames that are photographed as digital images can be revised and colors adjusted, this type of revision or color adjustment makes the image look flat and as if it has been painted, quite different to the real image.

The present invention was made against the above background and aims to provide a method for photographing lustrous objects, that enables the photographing of more natural and aesthetic images without reflection of the camera or lens on the surface of the object, more particularly, even on spectacle frames with highly reflective surfaces, such as metal frames. The present invention also aims to provide an spectacle frame photographing method and a method for creating electronic catalogues of spectacle frames using this method.

DISCLOSURE OF THE INVENTION

The first means of solving the above issues is a method for photographing lustrous objects with a camera. So that a reflected image of the above camera is not formed in the image of the lustrous object being photographed, an optical shield member is placed between said camera body and camera lens thereof, and the above lustrous object. In addition, an opening, having a size and shape suitable for photographing an image of the above lustrous object, is provided in the above lens shield member.

Use of the first means enables less reflection of the camera body and lens on the lustrous object through the provision of a shield member, which includes an opening, between the lustrous object and the lens, and thus enables more natural and fresher photography. Any material can be used for the shield member as long as it reduces the reflection of the camera and lens on the lustrous object. The shield need not be an optical shield member. Instead, a transmissible material that disperses light may be used.

The second means is the lustrous object photographing method of the first means wherein the above opening is of the minimum size and shape required to enable an image of the above lustrous object to be photographed.

Use of the second means enables reflection of the lens on the lustrous object to be minimized. Here, it is preferable that the shape of the opening be set so that the area of the opening is the minimum required for the shape of the object to be photographed.

The third means is the method for photographing lustrous objects of either the first or second means wherein the above shield member has a white surface.

Use of the third means enables favorable reduction of the reflection of the camera body and its lens on the lustrous object. White paper with little gloss is an example of a material with a white surface.

The fourth means is a method for photographing spectacle frames, wherein the method for photographing lustrous objects of any of the first through third means is used to photograph an image of the spectacle frames. Spectacle frames are used as the above lustrous object.

Use of the fourth means enables a reduction in the reflection of the camera body or its lens on the object, even when the spectacle frames are lustrous, thus enabling more natural and fresher photography.

The fifth means is the method for photographing spectacle frames of the fourth means, wherein the light of the flash is irradiated to the spectacle frames via a transmissible, light dispersing member when photography takes place.

The sixth means is the method for photographing spectacle frames of the fourth means, wherein the spectacle frames are photographed with said camera from a photography opening in a lighting box that has an indirect illumination function and into which the spectacle frames are placed.

The seventh means is the spectacle frame photographing method of the sixth means wherein the spectacle frames are covered by a transmissible, light dispersing material in which an opening for photography by the camera is made.

The eighth means is the method for photographing spectacle frames of the sixth means, wherein the camera used is a digital camera.

Use of a digital camera in photography enables digital information about spectacle frame images to be obtained, thus making subsequent editing and handling much simpler.

The ninth means is an electronic spectacle frame catalogue creation method used when creating electronic catalogues of spectacle frames in which information relating to spectacle frames, including all types of spectacle frame image information, is electronically recorded and wherein digital image information is used as the spectacle frame image information by digitizing images photographed using the method for photographing spectacle frames of any of the fourth through eighth means.

BEST MODE FOR CARRYING OUT THE INVENTION

Embodiment 1

Figure 1:
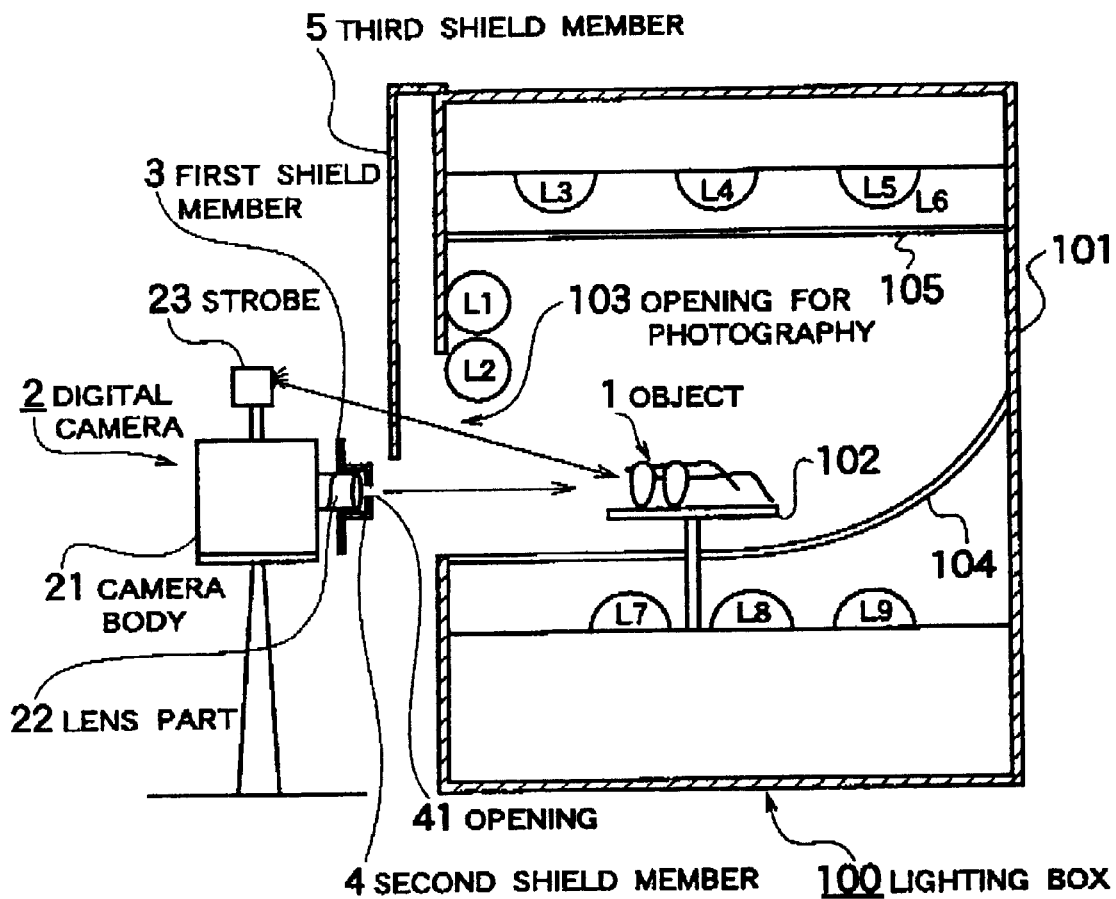
FIG. 1 is a partial cross-section that provides an overview of the configuration of the device for implementing the method for photographing spectacle frames used in the embodiments of the present invention.
Figure 2:
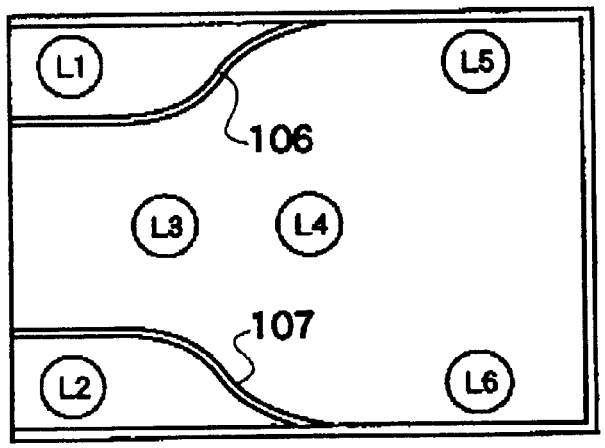
FIG. 2 is a cross-section through the top of a lighting box.
Figure 3:
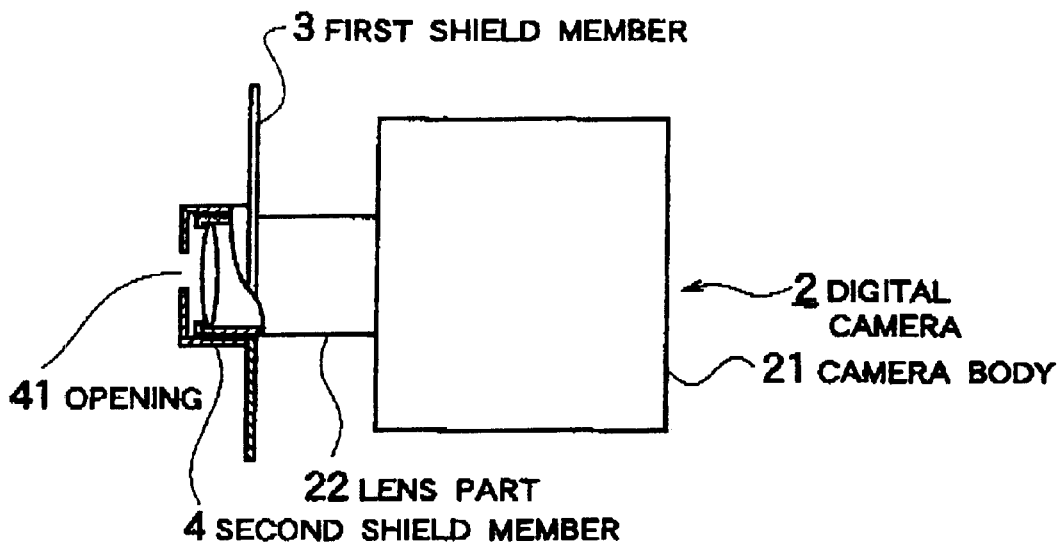
FIG. 3 is a cut-away view through part of the shield member mounted on the digital camera.
Figure 4:
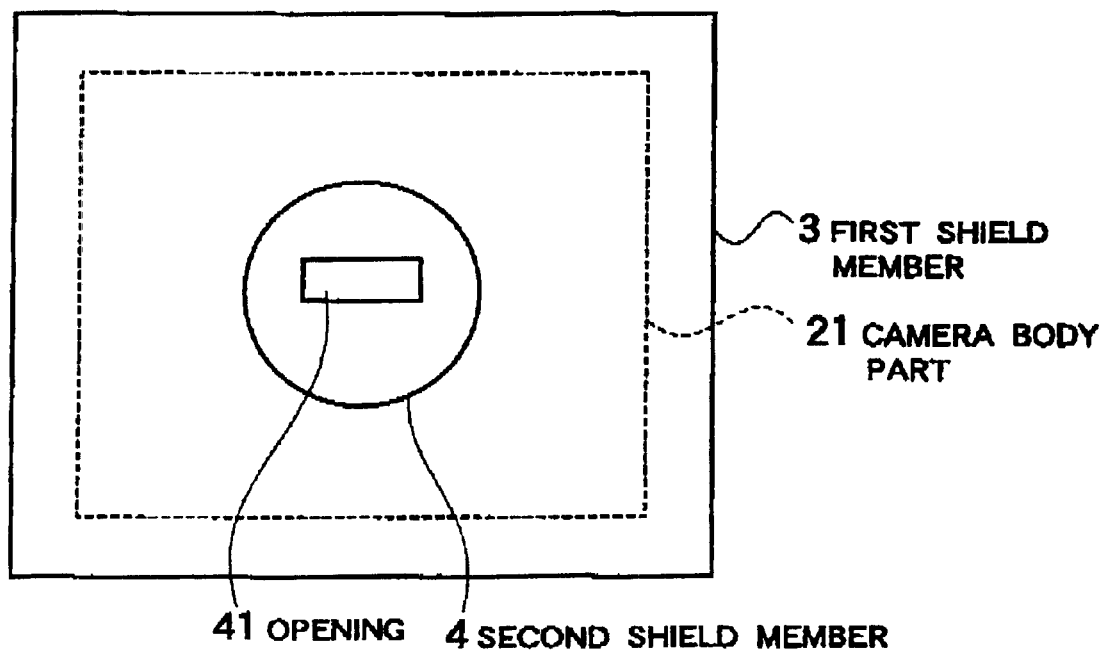
FIG. 4 is a plan drawing of the shield member in FIGS. 1 and 2.

Herein below, the method for photographing spectacle frames used in the embodiments of the present invention will be explained using the diagrams for reference. FIG. 1 is a partial cross-section showing an overview of the configuration of the device for implementing the method for photographing spectacle frames in a first embodiment of the present invention. FIG. 2 is a cross-section through the top of a lighting box, FIG. 3 is a partially cut-away view through part of the shield member mounted onto the digital camera, and FIG. 4 is a front view of the shield member.

As shown in FIG. 1, this method is a method for photographing an object 1 using a digital camera 2. The object 1 is a highly lustrous metal spectacle frame. In this example, the object 1 is set in a lighting box 100. The digital camera 2 has a lens of a diameter that is relatively large compared to that of an ordinary single-lens reflex camera. The lens part 22 at the front of the camera body 21 of this digital camera 2 is fitted with a first shield member 3, shaped like a sheath, and a second shield member 4 shaped like a cap.

The lighting box 100 is provided with an object placement table 102 situated in the middle of the main case 101. An opening for photography 103 is formed to enable the object 1, which is placed on this object placement table 102, to be photographed from the outside.

Also, forward side lamps L1 and L2, upper central lamps L3 and L4, upper rear side lamps L5 and L6, and lower central lamps L7, L8, L9, and so forth, are provided around the above object placement table 102. A controller, which is not shown, is used to change the direction of the light, the amount of light, and other lighting conditions as desired.

Transmissible, light dispersing material 104, 105, 106, and 107, made from a light transmissible, milky white acrylic board, is placed between each of the lamps and the object placement table 102. This enables the object 1 that is placed on the object placement table 102 to be indirectly lit by these lamps. The transmissible, light dispersing material 104, which is placed underneath the object placement table 102, is curved so that it rises towards the rear. This provides a background to the object 1.

The first shield member 3 is used to cover the optical link between the camera body 21 and the object 1 so that the camera body 21 does not enter the visual field of the object. This embodiment of the present invention uses a substantially square board of a size that means that the camera body 21 does not enter the visual field of the object 1. Also, the second shield member 4 covers the optical link between the object 1 and the lens 22 of the digital camera 2. This means that there is no reflection of the camera body 21 or lens of the lens member 22 on the photographed image of the lustrous object.

The second shield member 4 is shaped like a cap and fits onto the lens part 22. At the tip of this second shield member 4 is a rectangular opening 41. This opening 41 is used to photograph an image of the object 1 and is of the minimum size required to enable photographing of the image of the object 1. The opening is rectangular because the object in this embodiment of the present invention is an spectacle frame. When the object 1 is another shape, the size of the opening is formed so that it is the minimum necessary for the shape of that object.

The size and shape of the opening 41 is the minimum size and shape needed to ensure that the image of the object 1 being shown on the digital camera 2 is not lost while it is actually being observed. This is because the smaller this opening, the less the reflection. The first and second shield members 3 and 4 can be any white material with a non-glossy surface, for example, white paper.

When the object 1 is photographed by the digital camera 2, the object 1 must sometimes be irradiated by the light of a strobe flash 23. In these instances, a third shield member 5 is placed between the strobe 23 and the object 1. This third shield member 5 is a transmissible, light dispersing material such as white diffusion paper. This material prevents any reflection of the diffusion paper itself or of the lens opening and prevents unnatural images caused by unevenness in the light of the flash, thus enabling fresher looking images without reflections.

Figure 5:
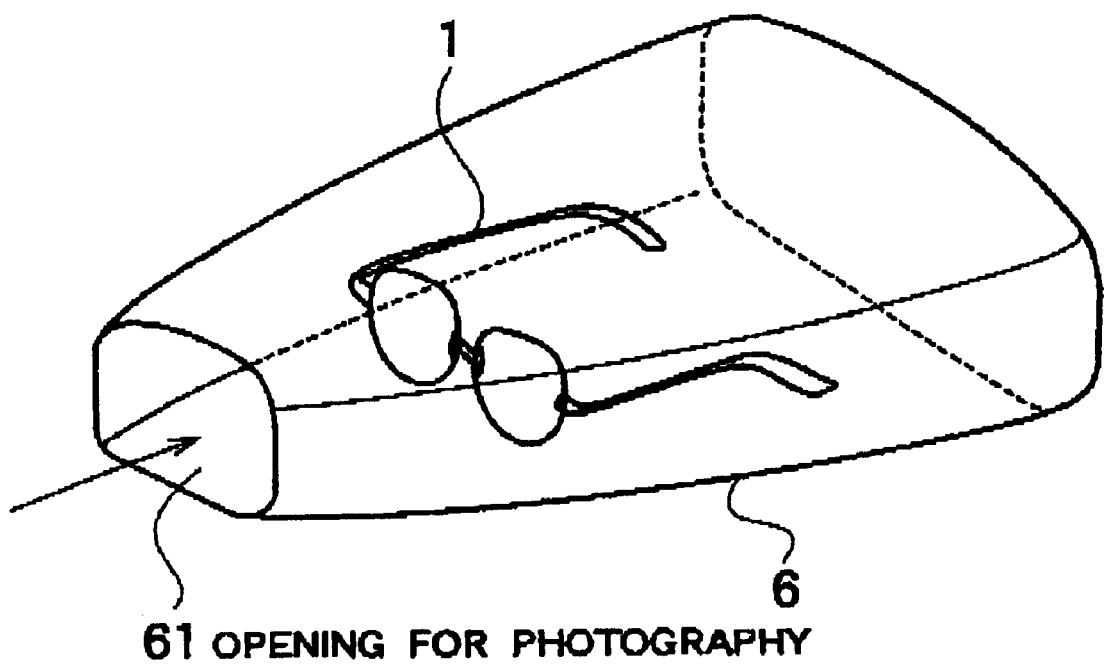
FIG. 5 shows a container 6 made from the transmissible, light dispersing material and that accommodates the object 1.

Furthermore, to obtain more natural and fresher images of objects, it is preferable that the object 1 (above spectacle frame) is again covered by a transmissible, light dispersing material. For example, the container 6 shown in FIG. 5 is made of transmissible, light dispersing material such as milky white acrylic board and broadens toward the bottom. An opening for photography 61 is provided in the container. The object 1 is photographed after being placed in this container which in turn is placed on the object placement table 102.

Various aspects are photographed as required so that various images of an spectacle frame, such as enlarged images of each part, plan view images, side view images, and perspective view images, can be obtained. Each time a photograph is taken, each lamp in the lighting box is adjusted and the size and shape of the opening 41 in the second shield member is adjusted so that a quality image without reflections and so forth can be obtained.

FIG. 5 shows a container 6 comprised of transmissible light dispersing material and accommodating object 1. The container 6 has an opening 61 for photographs to be taken of the object 1.

Figure 6:
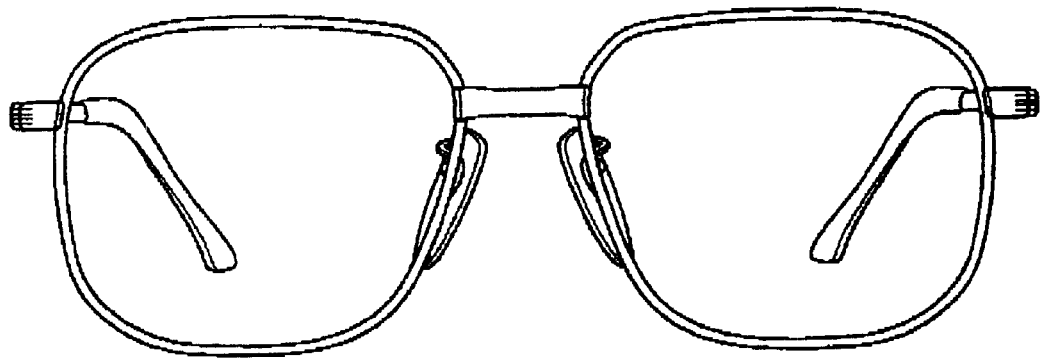
FIG. 6 shows an image of an spectacle frame obtained when a metal spectacle frame is photographed using the methods of the embodiments (photographed by irradiating light from a strobe flash using the shield member of FIG. 2)
Figure 7:
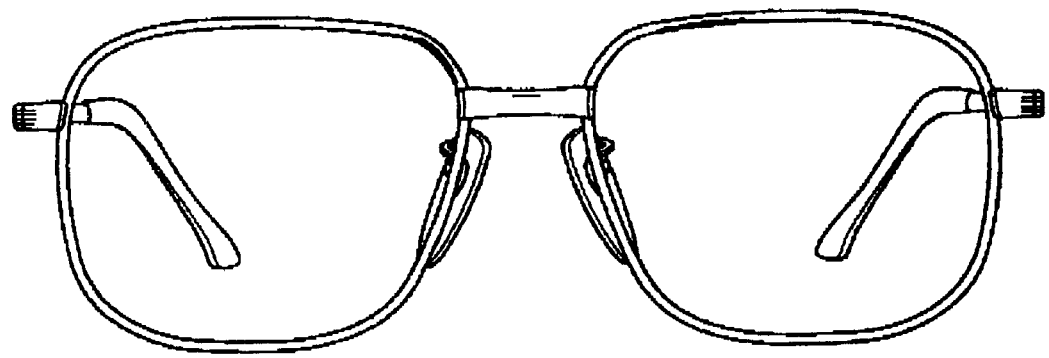
FIG. 7 shows an image of an spectacle frame obtained when photographed without using the shield member of FIG. 2 (photographed by irradiating the light from a strobe flash)
Figure 8:
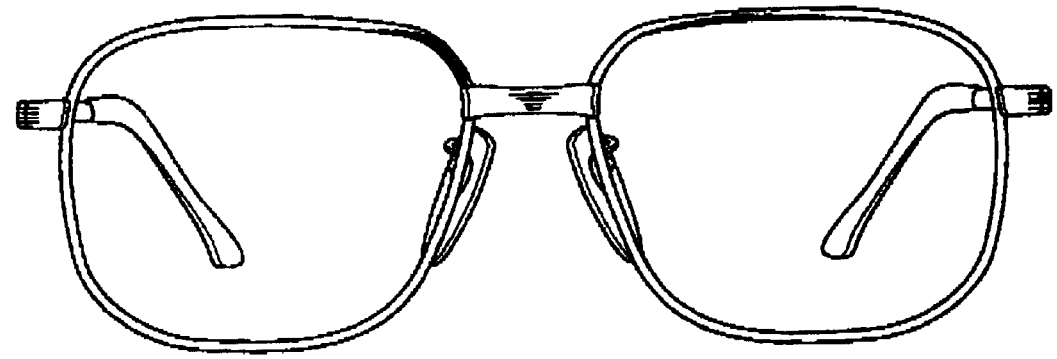
FIG. 8 shows the image of an spectacle frame obtained when photographed without using the shield member of FIG. 2 and without irradiating the light from a strobe flash.

FIG. 6 shows the image of an spectacle frame obtained when a metal spectacle frame was photographed using the method in this embodiment (using second shield member and photographed using the light from a strobe flash), FIG. 7 shows the image of an spectacle frame obtained when photographed without using the second shield member (photographed using the light from a strobe flash), and FIG. 8 shows the image of an spectacle frame obtained when neither the second shield member nor the light from the strobe flash were used.

A black shadow can be seen near the bridge of the frames in the images of the spectacle frames shown in both FIGS. 7 and 8. However, this is not seen in FIG. 6. Also, when the images in FIGS. 7 and 8, in both of which the black shadow appears, are compared, the size of the black shadow in the image shown in FIG. 7 is clearly smaller than that in FIG. 8.

The image shown in FIG. 6 was taken using the second shield member and the flash, the image shown in FIG. 7 was taken without the second shield member but with the strobe flash, and the image in FIG. 8 was taken using neither the second shield member nor the flash.

These results show that the above black shadow was a reflection of the lens of the digital camera 2 in the object 1 (spectacle frames). It is clear that use of the second shield member and the light from the flash enabled this reflection to be almost completely eliminated. It can also be seen that use of the flash also substantially reduced the reflection.

Figure 9:
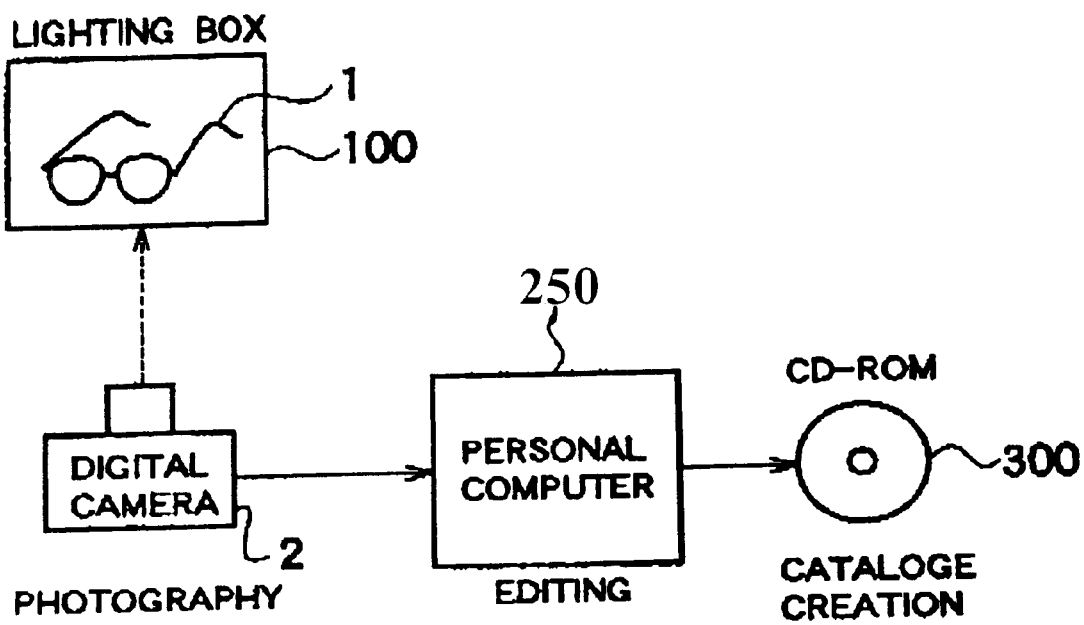
FIG. 9 shows the procedure for creating an electronic spectacle frame catalogue.

Next, as shown in FIG. 9, the image of the spectacle frame 1 photographed with the digital camera 2 is loaded onto a personal computer 250, edited with other required information, and used to make an electronic catalogue of spectacle frames. Here, required information may include for example, the type of spectacle frame, its name or model number, the brand of the spectacle frames, the company that manufactures them, the designer's name, the price, and any specified options. Options may include for example, spring hinges, ultra-flexible frames, a sunglass function, metal hypoallergenic frames, jeweled frames (jewelery), and gold frames.

In editing, the above personal computer 250 is used to link this required information, as written or audio information, to the image information for each spectacle frame. In other words, the image information, written information, and audio information is edited as a multimedia catalogue. For example, if a model number is specified, a list of image information for spectacle frames with that model number is shown. A specific image can then be selected from that list for display or printing out. Also, if, for example, the spectacle frame type and brand are specified, a matching list will be displayed. A specific image of specific spectacle frames selected from that list can then be selected for display or printing out. In addition, other information about the selected spectacle frame, for example its price and its list of options, can be displayed or output as written or audio data.

The thus edited electronic catalogue is stored in a storage device in the personal computer 250. The catalogue can be sent online to another computer or recorded onto a storage medium such as a CD-ROM 300 to provide a multimedia catalogue for use in the implementation of an spectacles try-on simulation.

Figure 10:
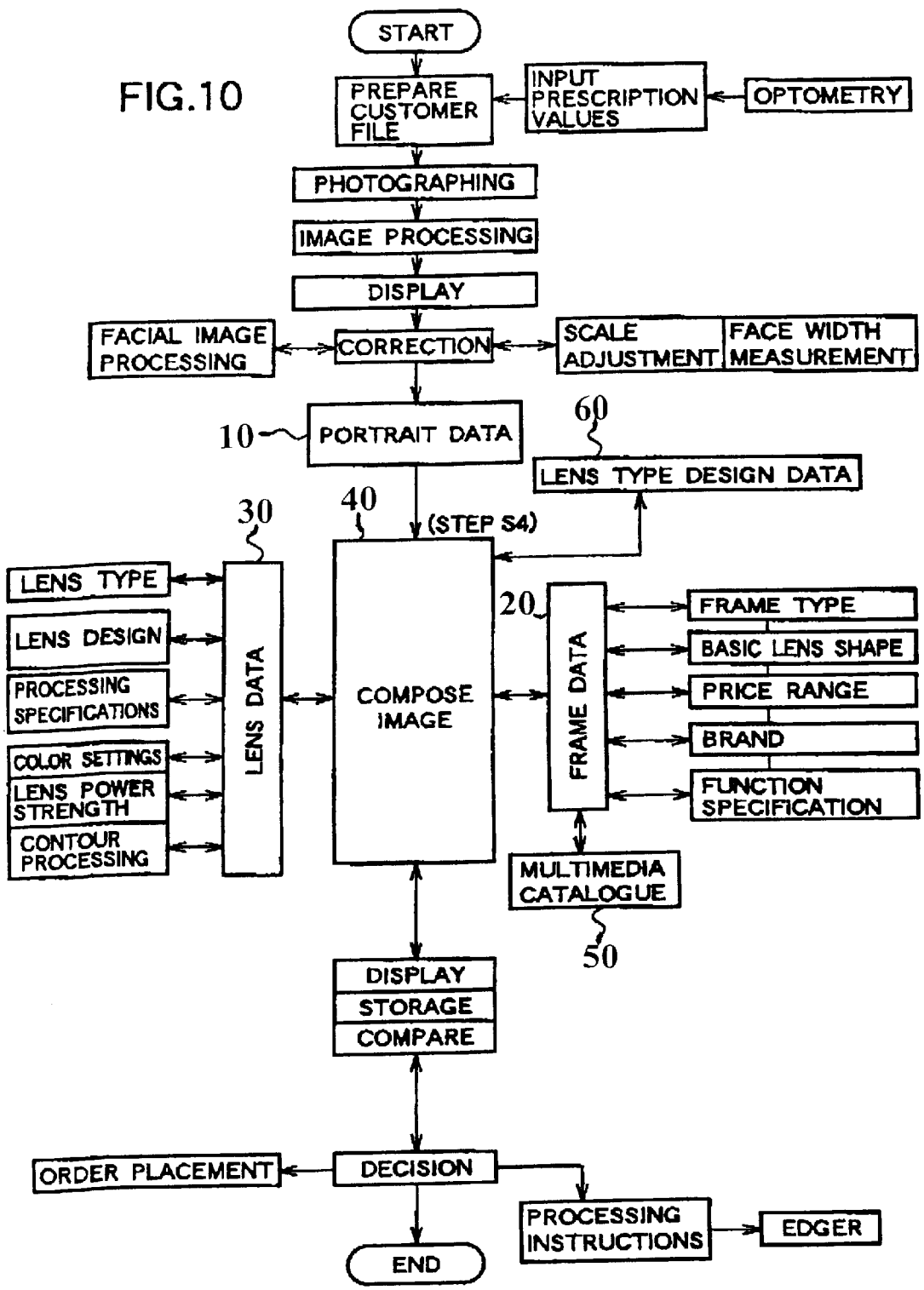
FIG. 10 gives an overview of the spectacles try-on simulation method.

FIG. 10 is a block diagram that overviews the spectacles try-on simulation method. This spectacles try-on simulation method creates the client portrait data 10, frame data 20, and lens data 30, respectively, and then, using an image synthesis method, creates an image 40 of the client wearing the frames fitted with the lens, based on this data, thus simulating the wearing of the spectacles.

This spectacles try-on simulation method enables a client's portrait to be photographed by a digital camera and converted into digital image information, and then to undergo the required facial surface processing and scale adjustment so that this image can be synthesized with the frame image. Based on previously input lens data, information such as the lens type, lens design method, processing specifications, and color is specified and lenses that suit the client are selected. Then, based on the frame data supplied from the multimedia catalogue 50, frames are selected by specifying the frame type, basic lens shape, price, brand, and functions. The thus selected lenses and frame are synthesized with the above portrait to simulate the wearing of the spectacles.

Using the above spectacles try-on simulation method, a client is able to quickly confirm how they appear wearing various spectacles that they have been able to freely select on the display screen, thus enabling them to obtain that are better suited to them. In addition, the image of the spectacle frame used in image synthesis looks extremely natural and maintains the actual feel of the spectacles, thus enabling a much better simulation.

In Embodiment 1 described above, the first shield member is sheath-like and the second shield member is cap-like. However, these are not the only shapes that can be used for shields. They may be of any shape that prevents the reflection of the camera body and lens on the object. It is also preferable to change the size and shape of the opening in the second shield member to suit the object. When the shape of the object is constant, the scope of the view can be selected by changing the distance to the lens, without changing the size and shape of the opening. Furthermore, the camera or other diaphragm function can be adapted to enable the size and shape of the opening to be changed freely.

Also, it is preferable to adjust the position of the object rather than the position of the camera. The object placement table 102 for holding or for placement of the frame inside the box should preferably be of a structure that allows adjustment of its position in all three directions and adjustment of angles. This allows the object placement table 102 to be adjusted to suit differently shaped and sized frames and different directions of photography.

Furthermore, it is preferable to use strobe photography, in which the third shield member is used, when photographing frames that are easily affected by reflections, where even the reflection of the lens opening must be considered.

Embodiment 2

Figure 11:
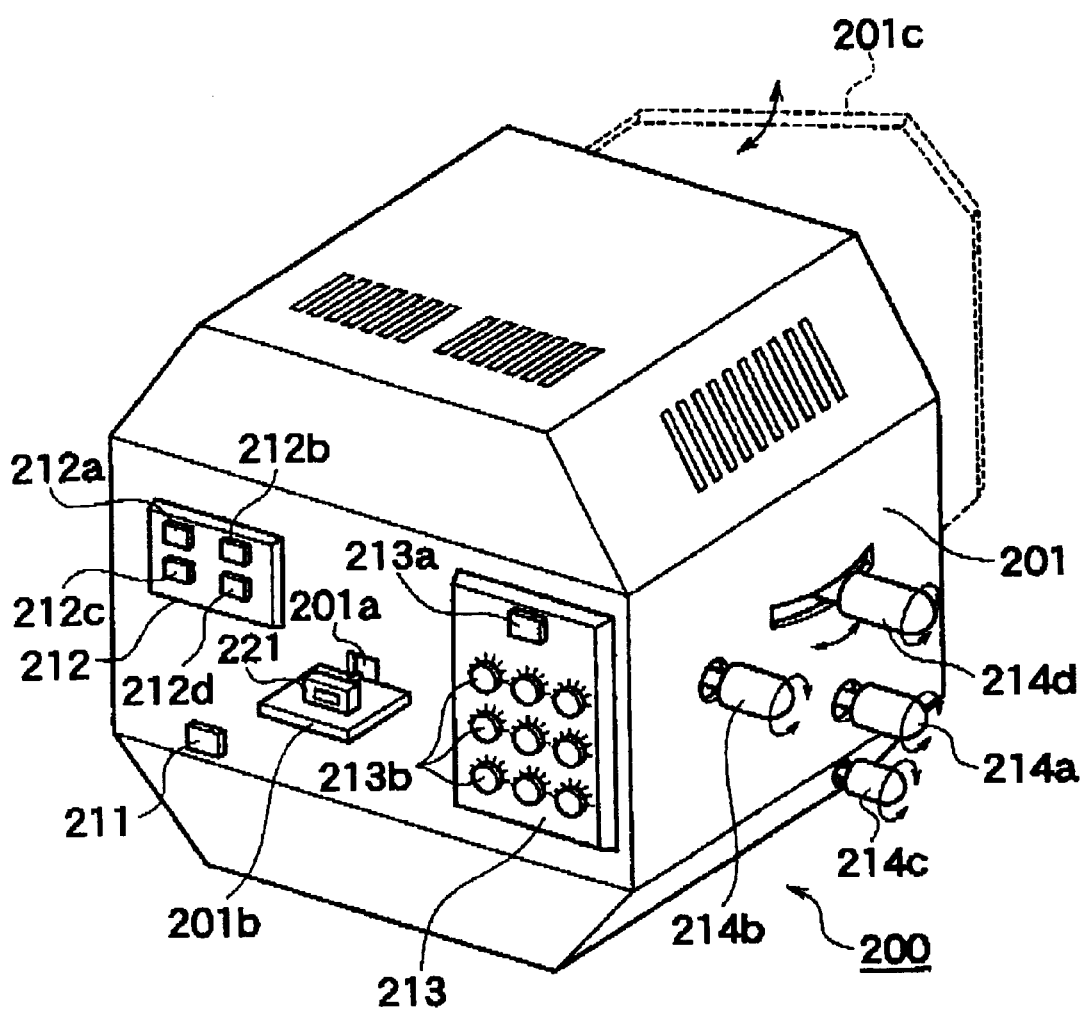
FIG. 11 is an external perspective view of the lighting box used for photography.
Figure 12:
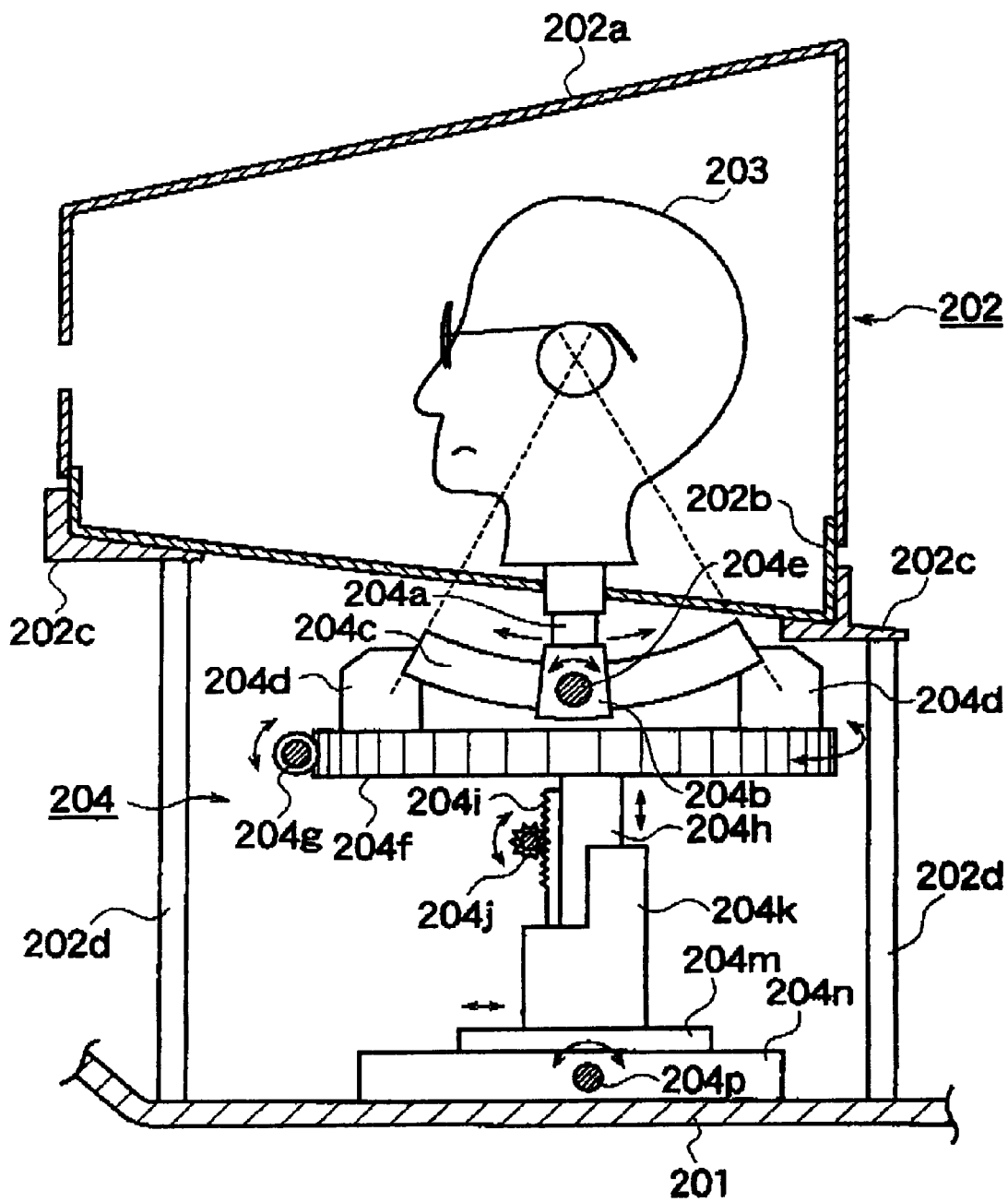
FIG. 12 is an enlarged partial cross-section showing the interior of the lighting box used for photography.
Figure 13:
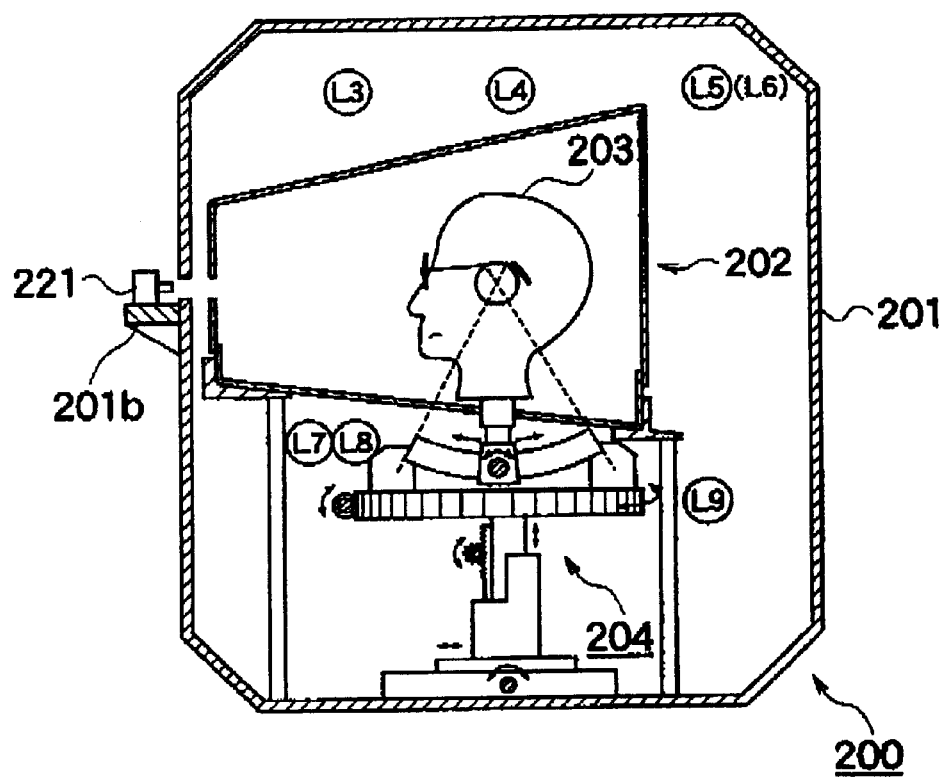
FIG. 13 shows the arrangement of lighting lamps within the photographic lighting box.
Figure 14:
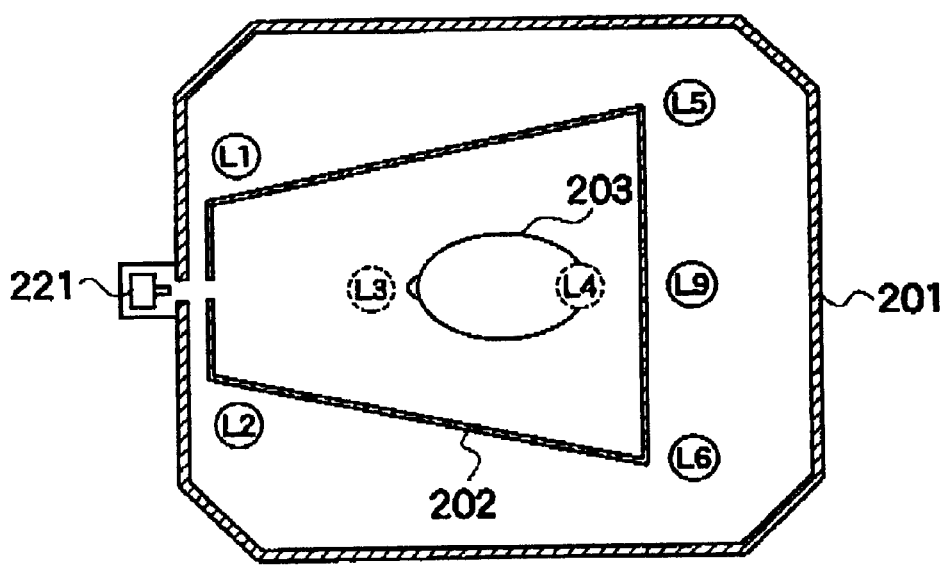
FIG. 14 shows the arrangement of lighting lamps within the photographic lighting box.

FIGS. 11 and 12 are diagrams for explaining the photographic lighting box in the method for photographing spectacle frames in a second embodiment of the present invention. FIG. 11 is an external perspective view of a photographic lighting box and FIG. 12 is an enlarged partial cross-section of the interior configuration of the photographic lighting box. FIGS. 13 and 14 show the arrangement of lighting lamps within the photographic lighting box.

The photographic lighting box 200 in these figures incorporates various devices in a white plastic main case 201. At approximately the center of the panel on the front of this main case 201 is an opening for photography 201a. Below this opening for photography 201 a is a camera stand 201b. A digital camera 221 is placed on this camera stand 201b and this camera 221 is used for the photography. On the rear panel 201c is a door that can be open and shut and that can be used to place the object, that is the spectacle frame 1, inside and outside the lighting box.

The type of camera 221 used is a digital camera with an extremely small lens diameter (of approximately 1 cm ,U). An example of this type of digital camera is the "FinePix 4700z" of the Fuji Photo Film Company Limited (maximum 4.32 million pixels).

The front panel also contains a main switch 211, a mode switching panel 212, and a light adjustment panel 213. The main switch 211 turns the main power to the photographic lighting box 200 on or off. The mode switching panel 212 has a front photographic mode button 212a, a side photographic mode button 212b, a close-up photographic mode button 212c, and a change mode settings and manual adjustment mode button 212d. These buttons are used as switches to set values according to the photographic mode, automatically adjusting the position and angle of the dummy head, which is described later, and adjusting the light from the lamps. Settings can be changed by pressing the change mode settings and manual adjustment mode button 212d a number of times. Its initial status is a mode photography status. When the button is pressed once more, the status changes to one in which the mode settings can be changed. Accordingly, when any mode button is pressed in this status, the manual adjustments described below are made. Those values are set as the values for that mode when the mode button is pressed again. When the settings for one mode have been made, the button is pressed again to change other values in a similar way. When the button is pressed twice after all values have been set, the status returns to the initial status, that is the mode photography status.

Also, the light adjustment panel 213 has a main lamp switch 213a and nine light adjustment knobs 213b that independently adjust the light for the nine separate lamps. These act as switches for adjusting the strength of light from the lamps, for setting the strength of the light in each photographic mode, and for adjusting the strength of the light from lamps when manually adjusting each lamp under conditions other than mode photography.

Furthermore, the side panel has a vertical adjustment knob 214a, a horizontal angle adjustment knob 214b, a forwards and backwards angle adjustment knob 214c, and a forwards and backwards position adjustment knob 214d. These are used as operation knobs for manual adjustment of the set position of the dummy head 203 described below. As discussed above, when the change mode settings and manual adjustment mode button 212d is pressed and these knobs operated, the position and angle settings for the dummy head 203, which are automatically set for each photographic mode, can be changed or the position for a particular photographic session determined.

As shown in FIG. 12, inside the main case 201 for the photographic lighting box 200, there are lighting means L1 through L9 comprising high color rendered fluorescent light tubes, a light dispersion case 202 comprising transmissible, light dispersing material for dispersing the direct light from these lighting means, a dummy head 203 placed inside the light dispersion case 202, and a position adjustment mechanism 204 that changes the vertical position and slope of the dummy head 203. Of the lighting means L1 through L9, the forward lighting means L1 and L2 in particular have light source functions for the strobe photography of Embodiment 1 and functions for enabling quality photography of the fronts of frames. Furthermore, although not specifically shown in the figures, among the components contained in the main case 201 is a circuit device required to enable light adjustment of the lighting means, a circuit device required to drive the position adjustment mechanism, and an electronic circuit device that is connected to the switches and to these circuit devices and that is required for the information processing device that controls these in accordance with the prescribed program.

The light dispersion case 202 comprising the transmissible, light dispersing material, is shaped so that it surrounds the dummy head 203 and comprises an upper member 202a and a lower member 202b. The upper member 202a is removably attached to the lower member 202b. There is an opening for photography 202c on the front side face of the upper member. When the dummy head 203 or the spectacle frame being worn by the dummy head 203 is replaced, the upper member 202a is removed from the lower member 202b. This light dispersion case 202 is supported inside the main case 201 by suitable braces.

The dummy head 203 is a model of a person's head and is formed from white non-glossy alabaster. Photography is done with the object, that is the spectacle frame 1, mounted on this dummy head 203. This enables photography from a number of directions to be done by changing the position and angle of the dummy head 203 and leaving the spectacle frame 1 itself fixed to the dummy head 203.

The dummy head 203 is removably attached to the head mounting shaft 204a on the position adjustment mechanism 204. This head mounting shaft 204a is fixed onto a motor-driven, freely running, rotation device 204b. This freely running rotation device 204b is mounted so that it moves freely on an arc shaped rail 204c. This arc shaped rail 204c is fixed onto a rotating stage 204e by mounting member 204d. Thus, the forwards and backwards rotation angle of the dummy head 203 can be adjusted by driving the rotation device 204b. The rotation device 204b can also be driven manually by a manual drive lever 204e. Attached at the tip of this manual lever 204e is the above forwards and backwards angle adjustment knob 214d. Operation of this knob allows manual adjustments to be made.

Around the periphery of the rotating stage 204e are gear cogs that mesh into a worm shaft 204g. Accordingly, the rotating stage 204f is rotated by rotating this worm shaft 204g. This worm shaft 204g is coupled to a motor-driven gearbox not shown in the diagrams. It can therefore be motor driven or manually driven using the above horizontal angle adjustment knob 214b that is coupled to this motor-driven gearbox.

The rotating stage 204e is mounted so that it rotates freely on a vertically mobile shaft 204h. This vertically mobile shaft 204h has a rack mechanism 204i. The cogs on this rack mechanism mesh into a pinion shaft 204j. The vertically mobile shaft 204h is mounted so that it moves freely up and down a guide shaft 204k. Accordingly, the vertically mobile shaft 204h can be moved up or down by rotating this pinion shaft 204j. This then allows the vertical position of the dummy head 203 to be adjusted. This pinion shaft 204j is also coupled to a motor-driven gearbox not shown in the diagrams and can be either motor driven, or manually driven using the above vertical adjustment knob 214b that is coupled to this motor-driven gearbox.

The above guide shaft 204k is fixed onto a block that can be moved backwards and forwards 204m. This block that can be moved backwards and forwards 204m is mounted so that it can move freely on a guide block 204n. The block that can be moved backwards and forwards 204m can be moved backwards and forwards by rotating a drive shaft 204p. This enables the position of the dummy head 203 to be adjusted forwards or backwards. This drive shaft 204p is also coupled to a motor-driven gear box not shown in the diagrams and can be either motor driven, or manually driven using the above forward and backward movement adjustment knob 214c that is coupled to this motor-driven gear box.

When photographing spectacle frames using the above photographic lighting box 200, an spectacle frame 1 is placed on the dummy head 203 and photographed by the digital camera 221. Here, when the front-on photographic mode button 212a is pressed, the dummy head 203 automatically faces the front and all the lighting means are automatically set to the optimum lighting strengths for front-on photography. Accordingly, the photographer can shoot the optimum front view merely by pressing the shutter on the digital camera. Next, when the side photographic mode button 212b is pressed, the dummy head 203 automatically rotates to the right by 90 degrees and the lighting means are set to the optimum status for side-on photography. Similarly, when the close-up photographic mode button 212c is pressed, the dummy head 203 still faces the side so that the endpiece can be photographed and moves forward to a position in front of the lens of the digital camera 221 so that a close-up photograph of the characteristics of the bow part of the frame arm can be taken.

Embodiment 2 enables extremely speedy photography and allows a photographer who is not skilled in photography to take excellent pictures. In Embodiment 2, the first and second shield members of Embodiment 1 are used in conjunction with the functions of the photographic lighting box itself.

INDUSTRIAL APPLICABILITY

As described above, the present invention allows images of lustrous objects to be photographed so that the camera is not reflected in the image. To do this, an optical shield member is placed between the camera body and camera lens thereof, and the spectacle frame. In addition, an opening, having a size and shape suitable for photographing the image of the lustrous object, is provided in the above lens shield member. More particularly, this enables the provision of a method for photographing lustrous objects, that enables even spectacle frames with highly reflective surfaces, such as metal frames, to be photographed more naturally and aesthetically without reflection of the camera or lens on the surface of the object, and also the provision of a method for photographing spectacle frames and an electronic spectacle frame catalogue creation method using this method.

What is claimed is:

1. A method for photographing lustrous objects, comprising:

placing a lustrous object in the inside of a lighting box having an opening for photographing said lustrous object with a camera, and an indirect lighting function for lighting said lustrous object indirectly;

providing an optical shield member consisting of any white material with a non-glossy surface between said camera and said lustrous object so that a reflected image of said camera is not formed in the image of the lustrous object being photographed;

providing an opening in said optical shield member for photographing said lustrous object with said camera;

setting the size and shape of said opening to be a size and shape necessary and sufficient for photographing said lustrous object;

photographing said lustrous object with said camera through said opening and said opening for photography;

wherein spectacle frames are photographed as said lustrous objects; and further wherein a container made of a transmissible light dispersing material and having an opening on the side of the opening for photography of said lighting box is provided in the inside of said lighting box and said spectacle frames are placed in said container to be photographed.

2. A method for photographing lustrous objects according to claim 1, further comprising:

providing a strobe flash for irradiating said spectacle frames by flash light; and providing an optical shield member consisting of a transmissible light dispersing material for dispersing said flash light between said strobe flash and said spectacle frames, wherein said spectacle frames are photographed while being irradiated by flash light generated from said strobe flash through said optical shield member for dispersing light, when said spectacle frames are photographed with said camera.

3. An electronic spectacle frame catalogue creation method, wherein image information photographed according to the method for photographing lustrous objects described in claim 2 is used as image information for said spectacle frames when creating an electronic spectacle frame catalogue, in which information relating to spectacle frames, including image information for various spectacle frames, is stored electronically.

4. An electronic spectacle frame catalogue creation method, wherein image information photographed according to the method for photographing lustrous objects described in claim 1 is used as image information for said spectacle frames when creating an electronic spectacle frame catalogue, in which information relating to spectacle frames, including image information for various spectacle frames, is stored electronically.

5. A method for photographing spectacle frames, comprising:

providing a dummy head resembling a portrait of the human head in the inside of a lighting box having a first opening for photographing spectacle frames by a camera and a lighting function for lighting said spectacle frames;

providing an adjustment system to adjust at least a vertical position and an inclination of said dummy head;

covering said dummy head with a light diffusion case made of a transmissible light dispersing material;

providing a second opening for photographing said spectacle frames by said camera in a portion corresponding to said first opening for photography of said light diffusion case;

setting the size and shape of at least one of said first and second openings for photography to be a size and shape necessary and sufficient for photographing said spectacle frames; and fitting said spectacle frames on said dummy head to photograph them by said camera through said first and second openings for photography.

6. An electronic spectacle frame catalogue creation method, wherein image information photographed according to the method for photographing spectacle frames described in claim 5 is used as image information for said spectacle frames when creating an electronic spectacle frame catalogue, in which information relating to spectacle frames, including image information for various spectacle frames, is stored electronically.

* * * * *